United States Patent

[15] 3,701,472

Eklund

[45] Oct. 31, 1972

[54] THERMOSTAT-CONTROLLED MIXING VALVE

[72] Inventor: Sven Emil Eklund, Gustavsberg, Sweden

[73] Assignee: AB Gustavsbergs Fabriker, Gustavsberg, Sweden

[22] Filed: Feb. 5, 1971

[21] Appl. No.: 112,915

[30] Foreign Application Priority Data

Feb. 13, 1970 Sweden .....................1865/70

[52] U.S. Cl. ...............................236/12 R, 236/102
[51] Int. Cl. ............................................G05d 23/13
[58] Field of Search ...........................236/102, 12 R

[56] References Cited

UNITED STATES PATENTS 3,540,650  11/1970  Boekelman et al..........236/12
2,792,180  5/1957  Flagg......................236/102 X

FOREIGN PATENTS OR APPLICATIONS 1,125,724  6/1959  Germany....................236/12

*Primary Examiner*—William E. Wayner
*Attorney*—Pierce, Scheffler & Parker

[57] ABSTRACT

The invention concerns a thermostat-controlled mixing valve, especially hot and cold water mixers for sinks and sanitary installations, comprising a manually operated flow control at the outlet, separate hot and sold fluid valves at the inlet and rod shaped feeler members for each of said inlet valves enclosed within a common, surrounding housing traversed by the fluid, the feeler member being both of a material with a higher coefficient of expansion than the surrounding housing in which one of the feeler members is tubular and surrounds the other feeler member, the valve for the cold water inlet and the valve for the hot water inlet moving in opposite control directions at the expansion or contraction of the feeler members. The valve for the cold fluid is further adjusted to be still open when the valve for the hot fluid is closed. The valve for the hot fluid is further connected to the flow control so as to be kept closed when the flow control is closed. A temperature control member is provided for longitudinal displacement of the feeler member for the cold fluid and thereby of the cold fluid valve member relative to its seat.

4 Claims, 4 Drawing Figures

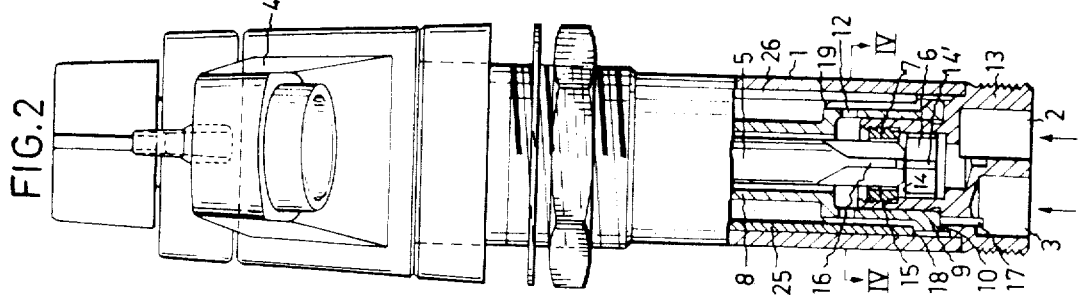

THERMOSTAT-CONTROLLED MIXING VALVE

This invention relates to a thermostat-controlled mixing valve with a manual flow control and with separate valves for hot and cold fluid operated each by a rod shaped feeler member located in a surrounding, common housing traversed by the fluid and made of a material with a higher coefficient of expansion than the material of the housing. The valve is especially intended for use for moderating the temperature of consumption water for sinks and sanitary devices such as wash stands, bath tubs and the like in bathrooms and closets in which hitherto mixers have been used which comprise a thermostat unit consisting of bimetal or bellow members with transmission members to the valves. Such devices are intricate precision mechanisms which are costy in manufacture, have a limited endurance and are very sensitive to corrosion and deposits from salts soluted in the water, which necessitates sofisticated cleaning filters which must be continuously attended to.

The present invention has for its purpose to eliminate the above drawbacks and is mainly characterized in that at least one of the feeler members is tubular and surrounds the other feeler member. According to a preferred embodiment of the invention, the temperature feeling members consist of temperature and age resisting plastic material with rugged and smooth forms which are freely movable relative to each other and within the housing. They are thus not submitted to wear, are resistant to corrosion and insensitive to deposits. Experience has also shown that plastic materials have a repulsing tendency towards dirt and deposits. According to a preferred embodiment, the cold water valve is never entirely closed. The result hereof is that dirt particles in the cold water cannot disturb the function of the valve. Since hot water can be considered as relatively pure and since the valve body made of plastic material is repulsive to dirt, it will be obvious that the valve will be less dependent of dirt filters. Other qualities of the valve according to the invention are that it is very reliable in operation, has a long life and is cheap in manufacture.

A preferred embodiment of the invention is described in the following with reference to the accompanying drawing.

FIG. 1 shows in a very diagrammatical and simplified embodiment the principles for the invention.

FIG. 2 shows a mixing valve according to the invention seen from the front towards the outlet and with the lower part in longitudinal section.

FIG. 3 shows the same valve in a side view and with the upper portion in a longitudinal section.

FIG. 4 shows a cross section along line IV—IV in FIG. 2.

The main principles of the invention will now be described with reference to FIG. 1. In a tubular housing 1, e.g. of brass, which at its lower end has a cold water inlet 2 and a hot water inlet 3 and at its upper end an outlet 4 for the mixed water, there is a feeler rod 5 of plastic material, the upper end of which is fixedly mounted in the top portion of the housing 1 and the lower end of which supports a valve body 6 cooperating with a valve seat 7 in the cold water inlet 2. A feeler tube 8 of plastic material concentrically surrounding the feeler rod 5 is at its upper end fixedly mounted in the upper portion of the housing 1 and has its lower end shaped as a valve cone 9 arranged to cooperate with a seat 10 in the hot water inlet 3. The feeler rod 5 and the feeler tube 8 are both made of a plastic material with a higher coefficient of longitudinal expansion than the brass of the housing. The coefficient of longitudinal expansion of the plastic material should not be less than $20 \cdot 10^{-6}$ and preferably be within the range of 36 to $110 \cdot 10^{-6}$. An appropriate material is a thermoplastic material such as polyphenylene oxide. It is of course also possible to use other materials than brass and plastic material under the condition that the difference in coefficients of longitudinal expansion is sufficiently large for obtaining a controlling effect.

When the outlet 4 is opened, cold water flows in through the inlet 2 and past the cold water valve 6 and upwards through the feeler tube 8 around the feeler rod 5 and finally out through openings 11 in the upper portion of the feeler tube. Hot water flows in through the inlet 3 and upwards past the hot water valve 9 and hence upwards through the space between the feeler tube and the housing 1 and finally joins the cold water in the upper part of the housing and leaves it through the outlet 4. Hot water can also penetrate into the space between the feeler rod 5 and the feeler tube 8 through openings 12 in the lower portion of the feeler tube and mix itself with the cold water.

When the mixture of cold water and hot water flows upwards through the housing 1, the latter as well as the feeler tube 8 and the feeler rod 5 are heated and expand in the longitudinal direction. The feeler tube 8 and the feeler rod 5 will expand more than the housing 1 and because of the relative positions of the valve seats, the valve body 9 mounted on the feeler tube 8 will throttle the hot water flow while the valve body 6 will increase the cold water flow. The expansion will continue until a stable state of equilibrium is reached in which mixed water of constant temperature will flow out through the outlet 4.

A mixing valve for practical use according to the invention with controlling means for adjusting the desired temperature of the water mixture will be described in the following with reference to FIGS. 2–4.

In this embodiment the parts having corresponding elements in FIG. 1 will bear the same reference numerals as there. The housing 1 consists of a mainly cylindrical tube of brass which at its upper portion has a spout 4. The lower end of the housing 1 is closed by a plug 13 having two axial connection bores in its lower part, i.e. one bore 2 for the cold water and one bore 3 for the hot water. The plug 13 extends upwards within the housing with a portion of less outer diameter than the inner diameter of the housing. This upwards extending portion of the plug 13 has a bore 14 extending from above and communicating at its bottom with the cold water inlet 2. A valve body 6 in the form of a cylindrical member with four longitudinal guiding fins 14 is freely movable axially within the lower portion of the bore 14. Above the valve body 6 there is a valve seat 7 screwed into the bore. The seat 7 has an axial bore 15 through which the lower end of the feeler rod 5 extends. This lower end of the feeler rod 5 has axial guide fins 16 with an outer diameter of a little less than the diameter of the bore 15 in the seat 7. The feeler rod 5 extends upwards through the housing in the form of a round bar of plastic material with a higher coefficient of longitudinal expansion than that of the brass in the housing. Surrounding the portion of the plug 13 extending upwards into the housing, a valve body 9 for the hot water valve is freely displaceable axially. The valve body 9 is in the form of a sleeve resting onto an abutting step 10 which forms the seat of the hot water valve and extends radially outwards from the portion of the plug of lesser diameter towards the inside of the housing. The step 10 has a traversing arcuate opening 17 communicating with the hot water inlet 3. The lower part of the valve body 9 has a slightly larger diameter than its upper part so that a step 18 is formed. This step forms an abutment for the upwards movement of the valve body 9. The upper part of the valve body 9 has four radial traversing bores 12 which open in longitudinal channels 19 at the outside of the valve member. The valve body 9, which is preferably of the same plastic material as the feeler bar 5, is formed into one piece with the feeler tube 8 which extends further upwards through the housing while surrounding the feeler bar 5 and with an inner diameter which is larger than the outer diameter of the feeler bar so that a space for the flow of liquid between the feeler members is formed.

In the upper part of the housing there are means for controlling the quantity of fluid and means for moderating the temperature. The means for controlling the quantity consists of a sleeve 21 with a handle 20, said sleeve having an opening 22 at the level of the mouth opening 23 of the spout 4 in the upper part of the housing 1. By turning the handle 20, the openings 22 and 23 can be brought to cover each other and by turning the handle from this position, the quantity flowing out through the spout 4 can be controlled. The lower horizontal edge of the sleeve has an axial downwards projection 24 arranged to engage the upper edge of a cylindrical transmission sleeve 26 extending along the inside of the housing 1 down to the step 18 on the valve body 9. The straight lower edge of the transmission sleeve 25 has the purpose to limit the axial movements of the valve body 9. The transmission sleeve 25 has a longitudinal slot 26 engaged by a guide pin 27, whereby the sleeve 25 is prevented from performing rotational movements. The upper edge of the transmission sleeve 25 has along a little more than half its periphery an inclined portion 28 forming a control cam of varying height for the sleeve 25 when the quantity controlling sleeve 21 is turned by means of the handle 20. The transmission sleeve 25 limits by its lower edge the upwards movement of the hot water valve body 9 so that the latter, when the handle 20 is turned to its closing position, is pressed onto its seat 10 by the transmission sleeve 25, whereby the hot water inlet is closed. When the handle 20 is adjusted in entirely or partly open position, the projection 24 on the quantity control sleeve 21 is turned so that a space is formed between the projection and the control cam of the transmission sleeve 12. The hot water valve body 9 can then be pressed upwards by the water pressure in a corresponding degree and thus hot water can flow into the valve. Simultaneously, cold water flows in past the cold water valve body 6 which is kept open relative to its seat 7 by the feeler rod 5. This is by means of a screw thread screwed into a knob shaft 29 which in its turn is screwed into the upper portion of the control sleeve 21. A sleeve member on the knob shaft extending down into the housing serves as a guide for the feeler tube 8. The knob shaft 29 has a portion extending outside the housing 1 and mounted with a knob 30 with an index projection 31 movable over a temperature scale 32 mounted on the handle 20 when the knob is rotated. The uppermost screw threaded portion of the feeler rod 5 ends in a screw head with a screwdriver slot 33, by which the feeler rod, when the knob is taken off, can be adjusted by means of a screwdriver into different levels relative to the cold water valve seat 7 so that the cold water flow can be adjusted to a desired highest mixing temperature. The cold water valve body 6 is adapted so that the cold water admission never will be entirely shut off. When turning the knob 30, the knob shaft 29 is screwed more or less into or out of the control sleeve 21, thereby producing an adjusting movement transmitted to both the hot water valve body 9 and to the cold water valve body 6 to adjust the desired mixing temperature. When the handle 20 is adjusted for opening the outlet, cold water will first flow past the always open cold water valve body 14 and immediately thereafter hot water will flow past the hot water valve body 9 in a quantity corresponding to the adjusted position of the knob. At this moment, the temperature of the water mixture will be higher than corresponds to the position of the knob. Thereafter, the feeler tube 8 connected to the hot water valve body as well as the feeler rod 5 will expand more than the housing 1, which results in that the hot water admission is reduced simultaneously as the cold water admission is increased. The hot water valve body and the cold water valve body will then rapidly take such positions that a mixture temperature is maintained which corresponds to the adjusting position of the knob. This temperature will be maintained even if the water outlet quantity is changed by means of the handle. When the handle is turned to closing position, the hot water valve body 9 will shut off the hot water admission while the cold water valve body 6 still remains open, so that when the control sleeve 21 is in the closed position, the valve will be filled with cool water.

The next time the taping valve is opened, cold water will first be admitted to the valve so that cool water always will flow out of the spout before the tempered water reaches the outlet. A risk for scalding is thereby entirely eliminated.

The connection between the cold water and hot water admissions is always closed when the outlet valve is closed, since the hot water valve body is always closed in this position. A special non-return valve is thus not necessary.

The mixer valve according to the invention has been described above in its application for mixing the water of different temperatures. It is, however, of course also possible to use it for the mixing of other liquids of different temperatures and could also, possibly with modifications in some details, be used for mixing of gases of different temperatures.

What I claim is:

1. A thermostat-controlled mixing valve having a manual flow control and separate valves for hot and cold fluid each separate valve being operated by a rod-shaped feeler member located in a surrounding, common, housing travered by the fluid, each said feeler member being made of a material with a higher coefficient of expansion than that of the material of the housing, at least one of the feeler members being tubular and surrounding the other feeler member, in which mixing valve the tubular outer feeler member is connected with the valve for hot fluid and is arranged to increase the quantity of passing fluid when the feeler member for the cold fluid reduces the quantity of passing fluid and vice versa, the valve for the cold fluid being adjusted still to be open when the valve for the hot fluid is closed.

2. A thermostat-controlled mixing valve having a manual flow control and separate valves for hot and cold fluid each separate valve being operated by a rod-shaped feeler member located in a surrounding, common, housing traversed by the fluid, each said feeler member being made of a material with a higher coefficient of expansion than that of the material of the housing, at least one of the feeler members being tubular and surrounding the other feeler member, which mixing valve comprises a manually operated flow control valve and a transmission member which connects said manually operated flow control valve with the valve for the hot fluid and keeps this closed when the flow control valve is closed.

3. A thermostat-controlled mixing valve having a manual flow control and separate valves for hot and cold fluid each separate valve being operated by a rod-shaped feeler member located in a surrounding, common, housing traversed by the fluid, each said feeler member being made of a material with a higher coefficient of expansion than that of the material of the housing, at least one of the feeler members being tubular and surrounding the other feeler member, in which mixing valve the tubular outer feeler member is connected with the valve for hot fluid and is arranged to increase the quantity of passing fluid when the feeler member for the cold fluid reduces the quantity of passing fluid and vice versa, which mixing valve further comprises a temperature-adjusting member consisting essentially of a shaft and an adjusting knob fixed to said shaft, the feeler member for the cold fluid being axially and adjustably connected by means of a screw connection with said shaft, said shaft being itself axially and adjustably connected by means of a screw connection with said flow control valve.

4. A mixing valve as claimed in claim 3 wherein the tubular feeler member is axially and freely displaceably connected with said shaft.

* * * * *